United States Patent [19]

Van Luyt et al.

[11] Patent Number: 4,794,465
[45] Date of Patent: Dec. 27, 1988

[54] METHOD OF AND APPARATUS FOR RECORDING AND/OR REPRODUCING A PICTURE SIGNAL AND AN ASSOCIATED AUDIO SIGNAL IN/FROM A RECORD CARRIER

[75] Inventors: Balthasar A. G. Van Luyt; Richard Bruno, both of Eindhoven, Netherlands; Jacques Taillade, Fontenay-aux-Roses, France

[73] Assignee: U.S. Philips Corp., New York, N.Y.

[21] Appl. No.: 918,175

[22] Filed: Oct. 10, 1986

[30] Foreign Application Priority Data

May 12, 1986 [NL] Netherlands ............... 8601182

[51] Int. Cl.$^4$ .............................................. H04N 5/76
[52] U.S. Cl. ..................................... 358/341; 360/10.1
[58] Field of Search ................ 358/312, 342, 341; 360/10.1, 10.3, 19.1, 32, 64, 33.1; 369/59, 49, 50; 364/521

[56] References Cited

U.S. PATENT DOCUMENTS 4,305,131 12/1981 Best ................................ 364/521

Primary Examiner—Donald McElheny, Jr.
Attorney, Agent, or Firm—Thomas A. Briody

[57] ABSTRACT

Finite audio and video signals are subjected to a digitizing code format and converted into blocks of audio and video words respectively. For the transmission of these blocks via a record carrier (2), for example a compact disc, the words are arranged in frames, Each frame has a frame header (8.1) and a data field (8.2). Such a data field contains information words in the form of either audio words or video words. The header indicates whether the associated data field contains audio words or video words. At least two audio signals associated with a video signal are recorded on the record carrier. An example of this is a "slide show" in which the explanatory text is available in two or more languages (e for English, f for French). The frame header of the frames containing an encoded audio signal also indicate to which one of the two or more audio signals the information words in an audio frame belong. Further, reference signals and additional frames (6) are recorded in the record carrier. For each of the two or more audio signals associated with a picture (or video) signal the additional frames contain time information on the time interval between the instant of detection of a reference signal after reading and the instant at which a picture signal read is to be displayed on a monitor (50). An apparatus for recording or reproducing the above signals is described.

13 Claims, 2 Drawing Sheets

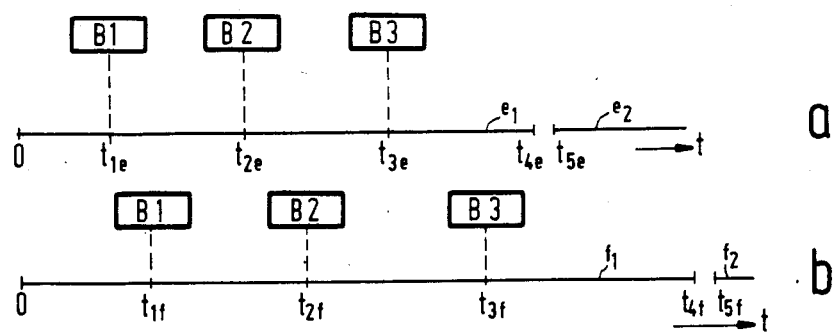
FIG.1
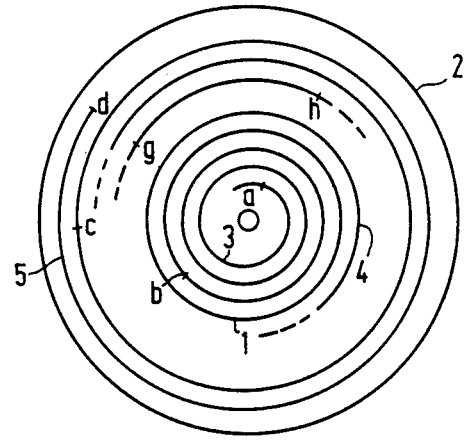
FIG.2
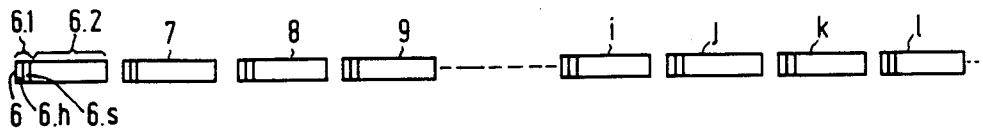
FIG.3
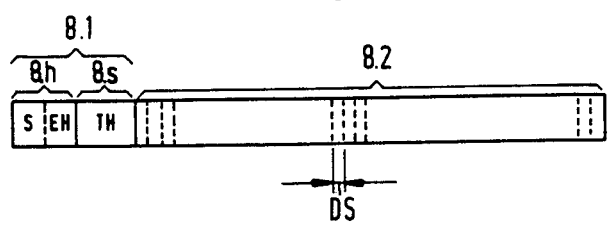
FIG.4
|   | B1 | B2 | B3 |
|---|----|----|----|
| e | $t_{1e}$ | $t_{2e}$ | $t_{3e}$ |
| f | $t_{1f}$ | $t_{2f}$ | $t_{3f}$ |
FIG.5

METHOD OF AND APPARATUS FOR RECORDING AND/OR REPRODUCING A PICTURE SIGNAL AND AN ASSOCIATED AUDIO SIGNAL IN/FROM A RECORD CARRIER

BACKGROUND OF THE INVENTION

The invention relates to a method of recording and/or reproducing a picture signal and an associated audio signal in/from a record carrier, in which during recording the picture signal and the audio signal are encoded to form a first and a second information signal respectively comprising information words arranged in frames, each frame comprising a frame header and a data field, a data field of a frame comprising a plurality of information words of the picture signal or an audio signal, the header indicating the information signal to which the information words in the data field belongs, after which the frames are recorded on the record carrier; and in which during reproduction the frames are read from the record carrier and are decoded to obtain the picture signal and the associated audio signal. The invention also relates to an apparatus for carrying out the method and to a record carrier obtained by means of the method. A method of the type defined in the opening sentence is described in the Applicant's previous Netherlands patent application No. 8,600,450. More in particular, the invention relates to a method of recording and reproducing picture signals and associated audio signals in the form of digital information in/from a record carrier, such as for example, a compact disc.

As is generally known, tne compact disc is a record carrier for the storage of digital information, which record carrier can contain a specific number of bits. The first application of the compact disc in the Compact Disc Digital Audio System, which is already a few years old envisaged its use as a record carrier for 16-bit PCM-encoded audio signals. For a comprehensive description of this system reference is made to Philips' Technical Review, Vol. 40, 1982, No. 6, in particular the article by J. P. J. Heemskerk et al entitled "Compact disc system aspects and modulation," pages 157 to 164.

A second application envisaged its use as a data ROM for data-processing equipment. A third application which is now being developed and envisages its use as a record carrier for digitized video signals of pictures accompanied by digital audio signals and, if desired, computer data.

The application of the compact disc now envisaged is an interactive use, referred to as "CD-I". Papers on this novel use have already been read at the Micro-soft Conference in Seattle, 3–5 Mar. 1986, namely a paper by D. C. Geest entitled "Standardization of CD-I" and a paper by R. Bruno entitled "New developments in optical media," which was published in the "Philips Koerier" of Mar. 13, 1986, pages 1 and 2.

In order to enable a picture to be recorded on a record carrier of the compact-disc type, the picture is divided into a plurality of lines (for example 280 lines) and every line is divided into a plurality of contiguous picture elements(for example 384 elements). It is assumed that each picture element is of uniform brightness and uniform colour. A picture element can be defined completely by a number of picture components; namely the luminance component $Y(i,k)$ and the two colour-difference components $U(i,k)$ and $V(i,k)$ or, which is in principle the same, by the three basic colour components $R(i,k)$, $G(i,k)$ and $B(i,k)$. Here i is the sequence number of the line and k the sequence number of the picture element on this line (column).

Each of the picture components of a picture element is subjected to a coding, so that for each picture element an information word is obtained, hereinafter referred to as "video word". If PCM coding is applied the picture components of each picture element are encoded separately, i.e. independently of corresponding picture components of other picture elements. However, if the picture components are subjected to a DPCM coding, broadly speaking only the difference between the corresponding picture components of every two successive picture elements is subjected to a PCM coding. Since encoding such a difference generally requires a smaller number of bits than separately encoding each of the picture components, DPCM encoding is applied for each of the picture components in the envisaged new application of the compact disc. This means that each picture elexent is characterized by a 12-bit video word.

For a most economic use of the capacity of the record carrier the entire block of $280 \times 384$ video words is transmitted only once. The monitor comprises a picture memory having a number of storage locations which is at least equal to the number of picture elements in the picture. Each storage location is unambiguously associated with a picture element and such a storage location contains the transmitted video word of the relevant picture element. This picture memory is read out repeatedly in the customary manner in order to display the relevant picture.

It is to be noted that in practice it is not found to be necessary to transmit both the luminance component and the two colour-difference components of each picture element. It is found to be satisfactory to transmit the luminance contents of each picture element and alternately the colour-difference component U and the colour-difference component V of successive picture elements. This means that each picture element can be characterized by an 8-bit video word. More in particular, the first four bits of this video word represent the luminance component of the picture element in DPCM format and the four other bits represent (alternately) one of the two colour-difference components, also in DPCM format. Hereinafter, the totality of video words to be transmitted, which together define a specific picture, will be referred to as a "video block".

In the novel application of the compact disc now envisaged, a video block is arranged in frames prior to recording on the record carrier, similarly to the digitized information components, audio and computer data. Each frame comprises, for example, 2352 bytes and each frame is roughly divided into two fields, namely a frame header comprising 24 bytes and a data field of 2328 bytes. The last 280 bytes in the data field may be used for error protection and error correction of the other bytes in the data field. This is utilized, for example, if the frame contains computer data.

The frame header inter alia comprises synchronization bytes for byte and bit synchronization, but also indicates whether the data in the data field is picture information, audio information or computer data. These cases are referred to as a video frame, an audio frame and a computerdata frame respectively. The data field of an audio frame comprises 1164 audio words of 16 bits each, while the data field of a video frame comprises 2328 video words of 8 bits each.

The novel use of the compact disc now envisaged moreover provides the possibility of choosing from a number of different audio-signal qualities.

Firstly, there is the quality known from the original use in the Compact Disc Digital Audio system. This results in compact disc fully packed with audio signals providing approximately 72 minutes of stereo sound of the well-known compact-disc quality (a dynamic range of 90 dB or better).

Secondly, there is the "hifi music" mode. This possibility provides two stereo channels which are reproducible parallel to each other or four mono channels which are reproducible parallel to each other. A full compact disc then provides approximately 72 minutes of sound per stereo channel. Thus, if on a compact disc only one monosignal should be recorded, it is possible to store 4×72 minutes of audio signal on a full compact disc. The quality corresponds to that of a conventional long-play record.

Thirdly, there is the "midfi music" mode. In this case a full compact disc contains four parallel channels, each channel accommodating a stereo signal of 72 minutes length, or eight channels containing a mono signal of 72 minutes length. The quality corresponds to that of an FM radio transmission.

A fourth possibility is the "speech" mode. This mode provides 8 parallel channels of stereo or 16 parallel channels of mono signal of maximum 72 minutes length on a full compact disc. The quality is the same as that of an AM radio transmission.

As is known, CD digital audio is encoded in accordance with a 16-bit PCM code and the full storage capacity of the compact disc is necessary for the storage bit of the 72-minute stereo signal.

The three other qualities with which the audio signal can be recorded on the record carrier are realized by means of an 8-bit or 4-bit ADPCM code (adaptive data pulse code modulation).

These three possibilities require a storage capacity of 50%, 25% and 12.5% for the storage of the audio information of one channel. The remainder of the storage capacity is then available for the storage of video information, computer data or for other sound channels. In the last-mentioned case it is possible to store speech in different languages in a corresponding number of parallel channels.

A fifth possibility is to encode the speech phonetically, so that an even longer playing time can be obtained. The standard phonetic alphabet as specified for the desired lenguage or languages is encoded and recorded on the compact disc together with a set of diphones for the desired language and a resynthesis program by means of which the speech can be resynthesized by joining the diphones to each other. The resulting information density in one channel can be very high and may result in a playing time of over 5000 hours for one full compact disc.

In those cases in which two or more parallel channels are available it is possible, as stated previously, to store the same speech translated in different languages in these channels on the compact disc. This is of particular importance when simultaneously reproducing picture information and associated speech, to provide a possibility of selecting the language in which said speech is to be reproduced.

SUMMARY OF THE INVENTION

It is the object of the invention to provide steps eaabling picture information together with one associated audio signal, selected from different audio signals associated with the picture information, to be reproduced from the record carrier. The audio signal is then for example a text spoken in a certain language and associated with the picture information (the picture). This picture information is associated with other audio signals, i.e. the same text but spoken in another language (other language). To this end the invention is characterized in that for recording at least a second addio signal associated with the picture signal the second audio signal is encoded to form a third information signal comprising information words arranged in frames, in that the frame headers of those frames which comprise an encoded audio signal moreover indicates to which of the two or more audio signals the information words in a data field of a frame belong, in that in addition reference signals and additional frames are recorded on the record carrier, which additional frames for each of the two or more audio signals associated with a picture signal contain time information pertaining to the time interval between the instant at which a reference signal is detected after read-out and the instant at which a read-out picture signal is to be displayed on a picture screen, and during reproduction the reference signals and the additional frames are read from the record carrier, the time information associated with one of the audio signals is derived from an additional frame under the influence of a first control signal, and subsequently a second control signal is derived from the time information thus derived and from a detected reference signal for displaying a read-out picture signal on a picture screen, and in that only said one audio signal is reproduced under the influence of the first control signal.

The invention is based on the recognition of the fact that, one language being of a more compact nature than the other language, or the successive order of words in a sentence being different for a dfferent language, the instant of displaying a picture associated with a text spoken in a specific language need not be the same as in the case that said text spoken in another language were reproduced. Therefore, for each language the record carrier should contain information on the instants at which successive pictures must be reproduced during a text spoken in a specific language. This information is constituted by the time interval between the instant at which a reference signal appears in the information read from the record carrier and the instant at which a picture is displayed. Thus, in general, this time interval will differ for the different audio signals (languages). A reference signal may be inserted in, for example, the frame header (for example the sub-header) of an addition frame. Another possibility is to include an associated reference signal for each audio signal (each language) in the frame header (for example, the sub-header) of the first frame which follows the additional fram and which contains information words of the relevant audio signal in a data field.

The time information may be included in the data field of an additional frame. These additional frames are anyway prent on the record carrier and contain the program to be read out add stored in the processor of the read apparatus to ensure a correct operation of the apparatus.

The apparatus for recording a picture signal and an associated audio signal, for carrying out the method, comprising a first input terminal for receiving the picture signal,
a second input terminal for receiving the audio signal,
an encoding unit having a first input and a second input coupled to the first input terminal and the second input terminal respectively, and having an output terminal, which encoding unit is constructed to encode the picture signal and the audio signal to obtain the first information signal and the second information signal respectively in the form of successive information words, which is constructed to arrange the information words in frames, which is constructed to insert a signal code into the frame header to indicate the information signal to which the information words in the data field of the associated frame belong, and which is constructed to produce a sequence of frames on its output,
a recording unit, having an input coupled to the output of the encoding unit, which recording unit is constructed to record the successive frames in the record carrier, is characterized in that the encoding unit is adapted to encode at least a second audio signal associated with the picture signal to form a third information signal in the form of successive information words, which is adapted to arrange said information words in frames, which is adapted to insert a signal code into the frame header of frames containing an encoded audio signal to indicate to which of the two or more audio signals the information words in the data fields of these frames belong, in that the encoding unit comprises a reference-signal generator for supplying reference signals, in that the unit is further adapted to generate additional frames, which additional frames contain said time information for each of the two or more audio signals associated with a picture signal, and which is adapted to produce these additional frames on its output terminal. Such an apparatus may be characterized further in that the encoding unit comprises an audio encoding unit for encoding an audio signal, having an input coupled to the second input terminal and having an output,
a video encoding unit for encoding a picture signal, having an input cuupled to the first input terminal and having an output,
a signal-combination unit having a first input, a second input and a third input coupled to the output of the audio encoding unit, the output of the video encoding unit and the output of the reference-signal generator respectively, and having an output coupled to the output terminal, in that the encoding unit further has a third input terminal for receiving said time information, which third input terminal is coupled to a fourth input of the signal-combination unit, and in that the signal-combination unit is adapted to arrange the information words from the audio-encoding unit and the video-encoding unit in the data fields of frames, which is further adapted to insert the signal code into the frame header of frames, and which is adapted to insert the time information into the additonal frames.

An apparatus for reproducing a picture signal and an associate audio signal, for carrying out the method, comprising a read unit for reading successive frames from the record carrier and for supplying said frames to an outuut,
a decoding unit having an input coupled to the output of the read unit and having a first output and a second output, which decoding unit is constructed to separate frames containing information words of the first information signal and of frames containing information words of the second information signal, which is cnnstructed to decode the first information signal and the second information signal to form the picture signal and the audio signal respectively and which is constructed to supply these signals to a first output terminal and a second output terminal respectively, characterized in that the decoding unit has a control input for receiving the first control signal and in that the decoding unit is adapted to derive, under the influence of the first control signal, one of the two or more audio signals and to supply this audio signal to its second output terminal, in that the decoding unit is further adapted to extract the reference signals and the additional frames from the information read from the record carrier, to derive the time information associated with the relevant audio signal under the influence of the first control signal, to derive the second control signal, and to supply the picture signal to its first output terminal under the influence of said second control signal.

Such an apparatus may be characterized further in that the decoding unit comprises a signal-separating unit, an audio decoding unit, a video decoding unit, a control unit and a clock signal generator, in that the input terminal is coupled to an input of the signal-separating unit, which has a first output, a second output and a third output coupled to inputs of the video-decoding unit, the audiodecoding unit and a first input of the control unit respectively, in that outputs of the video decoding unit and the audio decoding unit are coupled to the first output terminal and the second output terminal respectively, in that an output of the clock-signal generator is coupled to a second input of the control unit, which has an output coupled to a control input of the video decoding unit, and in that the control input of the decoding unit is coupled to control inputs of the signal-separating unit and the control unit, in that the signal-separating unit is adapted to extract the frames containing the first information signal from the signal read from the record carrier and to supply these frames to the first output, to extract frames containing the relevant audio signal under the influence of the first control signal applied to its control input and to supply these frames to its second output, which is adapted to extract the reference signal and the additional frames from the signal read from the record carrier, and to supply these signals to its third output, in that the control unit is adapted to derive the time information associated with the relevant audio signal from the additional frames under the influence of the first control signal and is adapted to generate the second control signal on its output from the time information derived and by means of the clock signal from the clock signal generator, and in that the video decoding unit is adapted to decode the first information signal to form a picture signal and is adapted to supply this picture signal to its output under the influence of the second control signal.

DESCRIPTION OF THE DRAWINGS

Embodiments of the invention will now be described in more detail, by way of example, with reference to the accompanying drawings. In the drawings FIG. 1 represents a "slide show" with an associated text which may be spoken in two languages, FIG. 2 shows a record carrier, FIG. 3 shows a number of successive frames in the information stream, FIG. 4 shows the structure of a frame, FIG. 5 represents the time information associated with the two languages.

DETAILED DESCRIPTION

Figure 6:
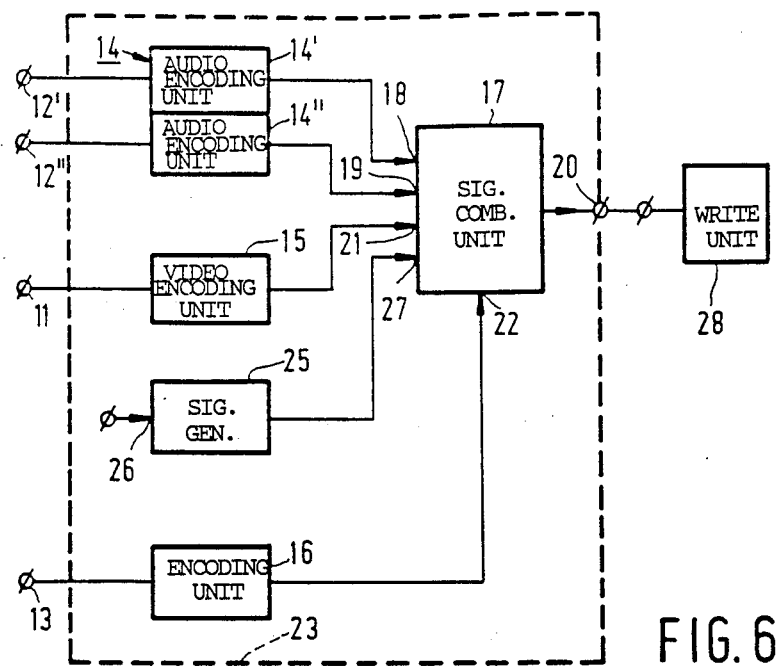
FIG. 6 shows an apparatus for recording and FIG. 7 shows an apparatus for reproducing pictures and associated speech.

FIG. 1 very schematically represents a "slide show" in which speech is illustrated with pictures. In FIG. 1a the line $e_1$ on the time axis t very schematically represents an audio signal in the form of a text spoken in a compact language, for example English. In FIG. 1b the line $f_1$ very schematically represents the same text but now spoken in a more ornate language, for example French. The text spoken in English is shorter, from $t=0$ to $t=t_{4e}$, than the text spoken in French. The latter has a length from $t=0$ to $t=t_{4f}$, where $t_{4f} > t_{4e}$, as is apparent from FIG. 1.

The texts $e_1$, $f_1$ may comprise one sentence or a plurality of sentences. A following text $e_2$, $f_2$ starts at the instants $t_{5e}$ and $t_{5f}$ respectively. In order to ensure that the text spoken in the two languages are nevertheless more or less synchronised with each other, for example $t_{5e}$ is selected to be substantially equal to $t_{5f}$.

The texts $e_1$ and $f_1$ spoken in English and French respectively is illustrated with three pictures $B_1$, $B_2$ and $B_3$. As a result of the differences in compactness or prolixity between the two languages the pictures for the two languages should not be applied at the same instants. From FIG. 1 it is evident that the pictures accompanied by the English-language text will be applied at an earlier instant that when accompanied by the French-language text, because $t_{1e} < t_{1f}$, $t_{2e} < t_{2f}$ and $t_{3e} < t_{3f}$.

When the picture signals of the three pictures and the two audio signals corresponding to the English English and the French text are recorded in the record carrier (compact disc) additional information has to be added in order to ensure that during reproduction the pictures are applied at the correct instants in conformity with the text spoken in one of the languages.

FIG. 2 schematically represents the record carrier (compact disc). The tracks extends over the record carrier 2 from the centre towards the circumference along a spiral path and is also recorded and read from the centre towards the circumference. The first spiral portion 3 between points a and b is the lead-in area. This lead-in area contains inter alia information on the contents of the record carrier. The portion 4 of the track between points b and c contains frames of encoded audio signals, frames of encoded picture signals, frames of computer data and additional frames. These additional frames may be the same as the frames of computer data. The spiral portion to the points c and d is the lead-out area. When the read means (the leaser beam) reaches this lead-out area reproduction and energization of the motor by means of which the record carrier is rotated are terminated.

FIG. 3 schematically represents the contents of the track between the points g and h in FIG. 2. The portion is selected in such a way that it contains the (encoded) picture and audio information of the pictures and the text of FIG. 1 spoken in English and the French language. The first frame 6 in the portion between the points j and k in FIG. 2 is an additional frame comprising a frame header 6.1 and a data field 6.2. The frame header 6.1 is divided into a first part 6.h, also referred to as "header", and a second part 6.5, is also referred to as "subheader". The following frames 7,8 . . . . etc. are divided in the same way into a frame header comprising a "header" and a "subheader", and a data field. FIG. 4 shows the structure of a frame in more detail. A frame, for example a frame 8, comprises 2352 bytes in total and is divided into a frame header 8.1 comprising 24 bytes and a data field 8.2 comprising 2328 bytes.

Further, the frame header 8.1 is divided into a 12-byte synchronization field S and a four byte first auxiliary field EH together forming the head 8.h and an p-byte second auxiliary field TH constituting the subheader. The synchronization field S indicates the beginning of the frame. It comprises one byte which only contains "0" bits followed by 10 bytes consisting of "1" bits only and finally another byte consisting of "0" bits only. The bytes in the first auxiliary field EH indicate the sequence number of the frame in the track. The second auxiliary field TH indicates whether the frame is a video frame, an audio frame or a computer-data frame. It is to be noted that a compact disc contains approximately 324,000 ($= 72 \times 60 \times 75$) frames in total. This is because a compact disc can contain approximately 72 minutes of music, for which 75 frames per second should be read.

The data field D is divided into data slots DS. For an audio frame these data slots are selected in such a way that in each slot one 16-bit audio word of a digital audio signal can be accommodated. For a video frame the data slots are selected in such a way that each slot can contain one 8-bit video word of a digital video signal. For computer-data frames these data slots also have a length of one byte.

As already stated in the foregoing, each picture is divided into a matrix of $280 \times 384$ picture elements $A(i,k)$. Herein, $i(=1, 2, \ldots 280)$ is the sequence number of the line (row) and $k (=1, 2, \ldots 384)$ is the sequence number of the picture element on said line (column). If for each picture element $A(i,k)$ an eight-bit video word $Q(i,k)$ is transmitted the transmission of a complete picture requires approximately 47 video frames.

If a data field of a frame is filled with information words of an audio signal recorded with the same quality as that of the Compact Disc Digital Audio system, 75 audio frames contain information for approximately one second of music. This is because, as stated previously, the record carrier is read at a rate of 75 frames per second.

If an audio signal is recorded on the record carrier with a lower sound quality after time compression an encoding, less audio frames are necessary to obtain one second of music (audio signal) after reading, decoding and time expansion. Thus, after reading an audio frame and after conversion of the information in this audio frame into an audio signal it may happen that an audio signal is reproduced during a long time interval while a (video) picture should be displayed, for example, somewhere halfway this time interval.

First of all, during recording on the record carrier allowance should be therefore made for the fact that all the information necessary for a video picture has already been read from the record carrier prior to the instant at which a video picture should be displayed in the aforementioned time interval during reading, and this information is available to be displayed on a picture screen at the instant at which a control signal occurs.

Secondly, it is necessary to have information about the instant at which a picture should be displayed within said time interval. It is not sufficient to insert merely a control signal in the frame header of the relevant audio frame withnn whose time interval (after time expansion of the information read from the audio frame) a picture occurs. This is because the picture should not be displayed at the instant at which this control signal in the audio frame is read but at a later instant, somewhere halfway said time interval.

Therefore, the record carrier should contain a control signal, hereinafter referred to as the reference signal, and time information, the time information indicating at which instant after a reference signal has been detected during reading, a picture is to be displayed.

This time information may be inserted in one or more of the additional frames. This means that for the various languages such an additional frame contains a table listing the time intervals between the instant of detection of the reference signal and the instant of displying a picture. This table may be inserted in, for example, the data field of an additional frame.

FIG. 5 shows such a table based on the example of FIG. 1. It is assumed that during reading the reference signal for the two languages is detected at the same instant, namely at the instant t=0 in the example of FIG. 1. This is not necessarily so, as will become apparent hereinafter.

The reference signal may be inserted in, for example, the subheader of an additonal frame. The reference signal is then detected after the relevant additional frame has been read. Detection is now effected at the same time for all languages.

Another possibility is to accommodate the reference signal in the subheader of the first frame which follows the additional frame and whose data field contains information words of the relevant language (the relevant audio signal). This means that for each language an associated reference signal is inserted in the subheader of the first frame which occurs after the additional frame in the data stream and which contains information pertaining to the relevant language. In this case detection for the different languages is effected at different instants.

The reference signal may be inserted in a subheader, for example as a code word having a specific configuration of "ones" and "zeros". After read-out this code word (these code words) can be detected by means of a suitable detector.

FIG. 6 shows an apparatus for recording a picture signal and an associated audio signal. The apparatus comprises a first input terminal 11 for receiving a picture (or video) signal, a second input terminal 12 for receiving an audio signal, and a third input terminal 13 for receiving the data. The apparatus comprises an encoding unit 23 comprising a number of sections, namely: an audio encoding unit 14, a video encoding unit 15, a data encoding unit 16 and a signal-combination unit 17.

The audio encoding unit 14 is adapted to encode at least two audio signals (associated with the at least two languages) and to arrange these encoded signals in frames. The audio encoding unit 14 comprises two encoding units 14' and 14" arranged in parallel. The audio signal corresponding to the English-language text is applied to the sub-input 12' of the encoding unit 14' and is encoded in the encoding unit 14'. The audio signal corresponding to the French-language text is applied to the sub-input 12" of the encoding unit 14" and is encoded in the encoding unit 14". The audio frames applied to the inputs 18 and 19 of the signal-combination unit 17 by the encoding units 14' and 14" are arranged after each other by the signal-combination unit and are serially applied to the output 20.

The encoding units 14' and 14" insert a signal code which indicates with which of the two audio signals (corresponding to the English or French text) the frames are associated into the subheader of each audio frame which appear on their ouputs. This means that the encoding unit 14' inserts one signal code corresponding to one audio signal (English) into the sub-headers of all the frames supplied by the unit 14' and that the encoding unit 14" inserts the other signal code corresponding to the other audio signal (French) into the sub-headers of all the frames supplied by the unit 14".

Instead of two parallel encoding units 14' and 14" the audio encoding unit 14 may comprise only one encoding unit. In that case there is only one input terminal 12 instead of the sub-inputs 12' and 12". The audio signals for the two languages should then be applied to the input terminal 12 in time-multiplexed form. Obviously, the audio encoding unit 14 should then be capable of separating the time-multiplexed signals, of encoding them separately and of arranging them in frames. Further, the audio encoding unit 14 should then be capable of inserting the correct one of the two signal codes into the subheader of a frame. The audio encoding unit 14 now combines the data frames to form a serial data stream which is applied to the signal combination unit 17 via a signal line.

The video unit is constructed to encode the video signals applied to the input terminal 11 and to arrange the encoded information in video frames, which are subsequently applied to the signal combination unit 17 via the input 21.

The data is applied to the data encoding unit 16 via the input terminal 13, which unit encodes the data and arranges the data in data frames which are applied to the input 22 of the signal combination unit 17.

The signal combination unit 17 joins the audio frames, the video frames and the data frames in the correct sequence to each other. On the output 20 this yields a sequence of frames, for example as indicated in FIG. 3, the frame 6 being, for example, a data frame. The frames 7 and 8 are, for example, audio frames, the frame 7 being the audio signal corresponding to (a part of) the English text of FIG. 1 and the frame 8 being the audio signal corresponding to (a part of) the French text of FIG. 1. The frame 9 may be, for example, a video frame. The data applied via the input terminal 13, which data is encoded and arranged in data frames by the encoding unit 16, inter alia contains the afore-mentioned time information (see FIG. 5). Thus, the time information is also encoded by the encoding unit 16 and accommodated in one or more data frames. Suitably, tee time information is inserted in the data field of a data frame, i.e. for example in the data field 6.2 of the data frame 6.

The apparatus shown in FIG. 6 comprises a reference-signal generator 25 which receives a control signal via a control input 27 and, depending on this control signal, supplies a reference signal, which for both languages may be inserted into the subheader of a data frame, in the present example the data frame 6.

The control signal may be an external signal or may be supplied by a central processing unit of the apparatus (not shown), which also controls the various units in the apparatus and provides the timing of the various operations to be performed in the apparatus.

The reference-signal generator 25 supplies the reference signal to the signal-combination unit 17 via the input 27, which signal-combination unit inserts the reference signal into the sub-header of a data frame applied to the signal-combination unit 17 by the data encoding unit 16. Obviously, it is also possible to apply the reference signals from the reference-signal generator 25 to the encoding unit 16. In that case the encoding unit 16 inserts the reference signals into the subheaders of the data frames. If the apparatus inserts the reference signals into the sub-headers of the audio frames, the signal-combination unit 17 is adapted to insert the reference signals supplied by the generator 25 into the subheaders of the first audio frame of each language following the data frame. For the English language the reference signal is then inserted into the frame 7 and for the French language into the frame 8.

The information steam comprising data, audio and video frames and appearing on the output 20 of the signal combination unit 17 is finally applied to the write unit 28 and recorded on the record carrier by the write unit 28 in the manner customary for compact discs.

Figure 7:
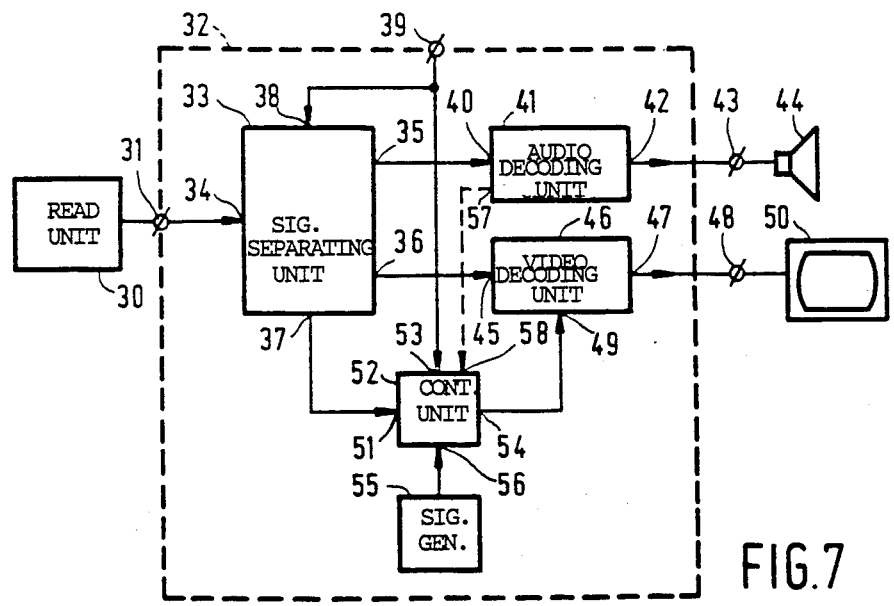

FIG. 7 shows an apparatus for reproducing a picture signal and an associated audio signal. The apparatus comprises a read unit 30 which reads the information from the record carrier in the manner customayy for compact discs and subsequently supplies this information to the input terminal 31 of a decoding unit 32. This decoding unit 32 comprises a signal-separating unit 33, which extracts the audio frames from the information stream applied to its input terminal 34 and supplies these frames to its output 35, which derives the video frames from this information steam and supplies them to its output 36, and which derives the data frames and supplies them to its output 37. A first control signal is applied to a control input 38. This first control signal may be an external control signal applied by the user of the apparatus. This signal enables the user to transfer his choice of the language in which the text of FIG. 1 is to be reproduced to the decoder unit 32 (via the control input 39). Under the influence of this control signal the separating unit 33 selects only those audio frames which contain the audio signal in the desired language and supplies these audio frames to its output 35.

The output 35 is coupled to an input 40 of an audio decoding unit 41 having an output 42 coupled to an output terminal 43 of the decoding unit 32. The audio decoding unit 41 decodes the audio frames in a manner inverse to the encoding by the audio encoding unit 14 (FIG. 6), so that on the output 42 an analog audio signal appears corresponding to the passage in the relevant language, see FIG. 1. By means of a loudspeaker 44 connected to the output terminal 43 this audio signal is rendered audible to the user.

The output 36 is coupled to an input 45 of a video decoding unit 46 having an output 47 coupled to an output terminal 48 of the decoding unit 32. The video decoding unit decodes the video frames in a manner inverse to the coding by the video encoding unit 15. If a full picture, such as the picture $B_1$ in FIG. 1, has been decoded by the video decoding unit 46, the picture information of this picture is stored in a memory in the decoding unit. At the instant at which a second control signal appears, which signal is applied to the control input 49 of the video decoding unit 46, this picture is read out of the memory and supplied, via the output 47, to a display 50 connected to the output terminal 48.

The separating unit 33 supplies the data frames to the input 51 of a control unit 52 via the output 37.

In this control unit the data frames are decoded, so that they can be used in the unit 52 for controlling some program steps in the apparatus. The control unit 52 is also adapted to extract the time information from a data field (such as 6.2 in FIG. 3) of a data frme, such as the data frame 6 in FIG. 3. Moreover, the first control signal is applied to a control input 53 of the control unit 52. For this purpose, the control input 53 is coupled to the control input 39 for the decoding unit 32.

Under the influence of this first control signal, which indicates the choice of the language in which a text is to be reproduced, the control unit 52 only reads out the time information associated with the selected language. If the English language is selected, the control unit 52 only reads out information in the upper row (designated "e") if the table in FIG. 5.

The control unit has an output 54 to which the second control signal is supplied in order to be applied to the control input 49 of the video-signal decoding unit 46.

Hereinafter, it will be explained how this control signal is derived: first of all, this is done for the situation in which the reference signals are included in the sub-headers of the data frames and subsequently for the situation in which the reference signals for each language are separately included in a subheader of an audio frame.

If a reference signal is included in the subheader of a data frame, the control unit 52 is adapted to derive the reference signal from a data frame applied to its input 51 (in particular from the subheader of this data frame, such as the data frame 6 in FIG. 3) and to detect this reference signal. Moreover, the control unit 52 is then adapted, to measure, after detection of the reference signal, the time intervals $t_{1e}$, $t_{2e}$, $t_{3e}$ and $t_{1f}$, $t_{2f}$, $t_{3f}$ respectively (see FIG. 5) depending on the selected language and to deliver a second control signal at the instants at which these time intervals have elapsed. This means that upon receipt of the three second control signals via the input 49, the video decoding unit 46 supplies the three pictures $B_1$, $B_2$ and $B_3$ from the picture memory (not shown) associated with the decoding unit 47 to the monitor 50 to display them on this monitor at the instants $t_{1e}$ (or $t_{1f}$), $t_{2e}$ (or $t_{2f}$) and $t_{3e}$ (or $t_{3f}$) depending on the selected language.

In the foregoing it is assumed that the control unit 52 detects the reference signal in the subheader of the data frame 6 at the instant $t=0$ in FIG. 1.

Measuring the time intervals is effected by the control unit 52 by means of a clock signal which is applied to the control unit 52 by a clock-signal generator 55 via the input 56.

However, if a reference signal is included in the subheader of the audio frame the second control signal is derived by the control unit 52 in a different manner. Detection of the reference signal should now be effected either in the signal separating unit 33 or in the audio decoding unit 41. The most obvious method is to effect detection in the decoding unit 41, because this decoding unit 41 receives only those audio frames which contain the audio signal in the selected language. This means that there is an additional coupling from the detection device in the decoding unit 41 to a control input 58 of the control unit 52 via the output 57 for supplying a control signal to the control unit 52 at the instant at which the reference signal is detected in the sub-header of an audio frame (which is the frame 7 for the English language and the frame 8 for the French language). The coupling between the output 57 of the decoding unit 41 and the control input 58 of the control unit 52 is indicated in broken lines. After receipt of the detection signal via the input 58 the control unit 52 counts the time intervals $t_{1e}$ (or $t_{1f}$), $t_{2e}$ (or $t_{2f}$) and $t_{3e}$ (or $t_{3f}$) depending on the selected language, use being made of the clock signal from the generator 55, and at the afore-mentioned instants it supplies the second control signal to the video decoding unit 46 via the input 49, so that the pictures $B_1$, $B_2$ and $B_3$ can be displayed on the monitor 50 at these instants.

The operation during reading is such that the information transfer is controlled by control signals present in the audio information. The audio information is read in an undisturbed and substantially continuous manner. This is to be understood to mean that audio blocks read from the record carrier and subsequently decoded to form audio signals are applied directly to the loudspeaker 44. However, the transfer of the video information to the monitor 50 is controlled by control signals inserted in the audio information for this purpose.

Further, it is possible to repeat the time information, the table in FIG. 5 or a part thereof, and insert this into a subsequent data frame (additional frame), for example the additional frame i in FIG. 3, which is the next additional frame in the information stream after the frame 6. This re-insertion of (a part of) the time information into a subsequent additional frame has the following resson.

It may occur, for example, that the total information content of the passage in FIG. 1, in the two languages and together with the information content of the three pictures, is more than can be accommodated in the frames 7, 8 to i-1. This means that the frames j, k, l, . . . should also contain information required for the passage in FIG. 1.

If random access to the information on the record carrier is required, reading can be started with the data frame 6 or the data frame i. It is assumed that during reading of the audio frames following the data frame i for example, the picture $B_3$ of FIG. 1 should be displayed on the monitor, while reading is started from the data frame i. This means that the data frame i should contain at least the time information associated with the picture $B_3$, i.e. at least the right-hand column of the table in FIG. 5.

It is to be noted that the scope of the invention is not limited to the embodiments described in the foregoing.

Various modifications to the embodiments described are possible within the scope of the invention as defined in the appended claims.

Further, it is to be noted that other features relating to the interactive use of the compact disc (CD-I) are described in the Applicant's previously filed Netherlands Patent Applications No.: NL TV 86.00.450 (PHQ 86.003), NL-TV 8600.980 (PHN 11.734), NL-TV 86.01.005 (PHN 11.738) and British Patent Application No. 8609078 (PHB 33.255).

What is claimed is:

1. A method of recording and/or reproducing a video signal and an associated audio signal in/from a record carrier comprising: during recording, encoding the video signal and the audio signal to form a first and a second information signal respectively comprising information words arranged in frames, each frame comprising a frame header and a data field, a data field of a frame comprising a plurality of information words of the video signal or an audio signal, the header indicating the information signal to which the information words in the data field belongs; recording the frames on the record carrier; during reproduction, reading the frames from the record carrier and decoding said frames to obtain the video signal and the associated audio signal, wherein for recording at least a second audio signal associated with the video signal the second audio signal is encoded to form a third information signal comprising information words arranged in frames, wherein the frame headers of those frames which comprise an encoded audio signal moreover indicate to which of the two or more audio signals the information words in a data field of a frame belong, wherein reference signals and additional frames are recorded on the record carrier, which additional frames for each of the two or more audio signals associated with a video signal contain time information pertaining to the time interval between the instant at which a reference signal is detected after read-out and the instant at which a read-out video signal is to be displayed, and during reproduction the reference signals and the additional frames are read from the record carrier, the time information associated with one of the audio signals is derived from an additional frame under the influence of a first control signal and subsequently a second control signal is derived from the time information thus derived and from a detected reference signal for displaying a read-out video signal, and wherein only one of said audio signals is selected and reproduced in response to a first control signal.

2. A method as claimed in claim 1, wherein the detected reference signal is inserted in a sub-header of an additional frame.

3. A method as claimed in claim 1, wherein for each audio signal an associated reference signal is included in a subheader of the first frame which follows the additional frame and which contains information words of the relevant audio signal in its data field.

4. A method as claimed in claim 1, characterized in that time information is included in the data field of an additional frame.

5. An apparatus for recording a video signal and an associated audio signal in the record carrier, comprising
   a first input terminal for receiving the video signal,
   a second input terminal for receiving at least two audio signals,
   an encoding unit having a first input and a second input coupled to the first input terminal and the second input terminal respectively, and having an output terminal, which encoding unit is constructed to encode the video signal and an audio signal to obtain the first information signal and the second information signal respectively in the form of successive information words, which is constructed to arrange the information words in frames, which is constructed to insert a signal code into a frame header to indicate the information signal to which the information words in the data field of the associated frame belong, and which is constructed to produce a sequence of frames on its output, a recording unit, having an input coupled to the output of the encoding unit, which recording unit is constructed to record the successive frames in the record carrier, wherein the encoding unit is adapted to encode at least a second audio signal associated with the video signal to form a third information signal in the form of successive information words, which is adapted to arrange said information words in frames, which is adapted to insert a signal code into the frame header of frames containing an encoded audio signal to indicate to which of the two or more audio signals the information words in the data fields of these frames belong, wherein the encoding unit comprises a reference-signal generator for supplying reference signals, wherein the unit is further adapted to generate additional frames, which additional frames contain said time information pertaining to the time interval between the detection of a reference signal and the instant a read-out video signal is to be displayed for each of the two or more audio signals associated with a video signal, and which is adapted to produce these additional frames on its output terminal.

6. An apparatus as claimed in claim 5, wherein the encoding unit comprises
   an audio encoding unit for encoding an audio signal, having an input coupled to the second input terminal and having an output,
   a video encoding unit for encoding a video signal, having an input coupled to the first input terminal and having an output,
   a signal-combination unit having a first input, a second input and a third input coupled to the output of the audio encoding unit, the output of the video encoding unit and the output of the reference-signal generator respectively, and having an output coupled to the output terminal of said apparatus, in that the encoding unit further has a third input termrnal for receiving said time information, which third input terminal is coupled to a fourth input of the signal-combination unit, and in that the signal-combination unit is adapted to arrange the information words from the audio-encoding unit and the video-encoding unit in the data fields of frames, which is further adapted to insert the signal code into the frame header of frames, and which is adapted to insert the time information into the additional frames.

7. An apparatus as claimed in claim 6, wherein the signal-combination unit is adapted to insert the reference signal into the sub-header of an additional frame.

8. An apparatus as claimed in claim 6, wherein the signal-combination unit is adapted to insert for each audio signal a reference signal associated with the audio signal into the subheader of the first frame which follows the additional frame and which contains information words of the relevant audio signal in its data field.

9. An apparatus as claimed in claim 6, wherein the signal-combination unit is adapted to insert the time information into the data field of an additional frame.

10. An apparatus for reproducing a video signal and an associated audio signal form a record carrier comprising a read unit for reading successive frames of video signals and one of at least two audio signals from the record carrier and for supplying said frames to an output, a decoding unit having an input coupled to the output of the read unit and having a first output and a second output, which decoding unit is constructed to separate frames containing information words of a first information signal representing an encoded video signal and of frames containing information words of a second information signal representing encoded audio signals, which is constructed to decode the first information signal and the second information signal to form the video signal and the audio signal respectively, and which is constructed to supply these signals to a first output terminal and a second output terminal respectively, wherein the decoding unit has a control input for receiving a first control signal and in that the decoding unit is adapted to derive, under the influence of the first control signal signal, one of the two or more audio signals and to supply this audio signal to its second output terminal, in that the decoding unit is further adapted to extract the reference signals and the additional frames from the information read from the record carrier, to derive the time information associated with the relevant audio signal under the influence of the first control signal, said time information pertaining to the time interval between the instant at which a reference signal is detected after read-out and the instant at which a read-out video signal is to be displayed, to derive the second control signal, and the supply a video signal to its first output terminal under the influence of said second control signal.

11. An apparatus as claimed in claim 10, wherein the decoding unit comprises a signal-separating unit, an audio decoding unit, a video decoding unit, a control unit and a clock signal generator, in that the input terminal is coupled to an input of the signal-separating unit, which has a first output, a second output and a third output coupled to inputs of the video-decoding unit, the audio-decoding unit and a first input of the control unit respectively, wherein outputs of the video decoding unit and the audio decoding unit are coupled to the first output terminal and the second output terminal respectively, wherein an output of the clock-signal generator is coupled to a second input of the control unit, which has an output coupled to a control input of the video decoding unit, and wherein the control input of the decoding unit is coupled to control inputs of the signal-separating unit and the control unit, wherein the signal-separating unit is adapted to extract the frames containing the first information signal from the signal read from the record carrier and to supply these frames to the first output, to extract frames containing the relevant audio signal under the influence of the first control signal applied to its control input and to supply these frames to its second output, which is adapted to extract the reference signal and the additional frames from the signal read from the record carrier, and to supply these signals to its third output, wherein the control unit is adapted to derive the time information associated with the relevant audio signal from the additional frames under the influence of the first control signal and is adapted to generate the second control signal on its output from the time information derived and by means of the clock signal from the clock signal generator, and wherein the video decoding unit is adapted to decode the first information signal to form a video signal and is adapted to supply this video signal to its output under the influence of the second control signal.

12. An apparatus as claimed in claim 11 wherein the control unit is adapted to extract the reference signal from the sub-header of an additional frame.

13. An apparatus as claimed in claim 11 wherein the control unit is adapted to extract the time information associated with the relevant audio signal from a data field of an additional frame under the influence of the first control signal.

* * * * *